UNITED STATES PATENT OFFICE.

HIPPOLYTE MÉGE, OF PARIS, FRANCE, ASSIGNOR, BY MESNE ASSIGNMENTS, TO THE UNITED STATES DAIRY COMPANY.

IMPROVEMENT IN TREATING ANIMAL-FATS.

Specification forming part of Letters Patent No. 146,012, dated December 30, 1873; Reissue No. 5,868, dated May 12, 1874; Reissue No. 8,424, dated September 24, 1878; application filed August 15, 1878.

*To all whom it may concern:*

Be it known that I, HIPPOLYTE MÉGE, of Paris, France, have discovered a new and Improved Process of Transforming Animal-Fats into Butter, of which the following is a full, clear, and exact description.

The butter which is obtained from milk is produced by the cow elaborating her own fat through her cellular mammary tissues at the low rate of temperature of the body.

The animal fat from which the butter-cells in milk are produced is composed chiefly of oleine, margarine, and stearine, and small quantities of other substances.

The natural process performed by the cow consists, mainly, first, in separating the oleomargarine from the stearine without developing disagreeable odors or flavors in the oleomargarine; and, secondly, in producing a slight change in the oleomargarine, by which it assumes the character of butter.

My invention, hereinafter described, is based upon a discovery made by me, that when the fat is rendered at a low temperature, considerably below that heretofore employed in the ordinary rendering of fat, it has the taste of molten butter, and does not acquire that peculiarly disagreeable flavor heretofore supposed to be necessarily attached to melted fat or tallow, and which is designated as "tallowy flavor."

I have succeeded in obtaining excellent results by rendering the crude fat at a temperature of 103° Fahrenheit, which is below the temperature at which the tallowy flavor is created. The temperature may be raised above this point in order to facilitate the operation, provided care be taken to avoid attaining the temperature at which the tallowy flavor is created.

The precise limit to which it is safe to increase the rendering-temperature can be ascertained by trial under various circumstances with the different kinds of fat. The temperature must, however, be far below that heretofore ordinarily used in rendering fats when no such object as I propose—to wit, the making of a butter-like product—was had in view. I do not think it would be safe to vary many degrees above that specifically indicated.

I have also discovered that, in order to neutralize any fermentation of the fat before or during its treatment, the raw fat should, as soon as possible after the death of the animal, be plunged in a solution of fifteen (15) per cent. of common salt and one per cent. of sulphite of soda, the effect of which would be to prevent such fermentation.

In carrying out my process I first crush, grind, or disintegrate the fat by any suitable machinery, such as rollers or millstones, in order to break up the cellular tissues in which the fat is contained in the animal, and thus cause it to be more easily melted or rendered by the application of low temperatures. This fat thus disintegrated is to be slowly raised to a temperature of 103° Fahrenheit in a vessel in which the temperature can be raised at will until the rendering shall be complete. The temperature, as before stated, must be so regulated that the rendered fat will have the taste of molten butter, and care should be taken not to heat it so as to induce the change which produces the usual disagreeable taste of melted fat or tallow, instead of the taste of molten butter, which temperature is considerably below that heretofore ordinarily used in rendering fat, and will be found to vary not many degrees above the point already stated.

I also add to the fat while being rendered, for the purpose of aiding in this process, two liters of gastric juice to a hundred (100) kilograms of fat. This gastric juice is made by macerating, for three hours, half of the stomach of a pig or sheep, well washed, and three liters of water containing thirty grams of bi-phosphate of lime. After maceration this macerated substance is passed through a sieve, and then added to the fat under treatment in the proportion of two liters to one hundred (100) kilograms.

The separation of the organized tissues from the fat is aided by the introduction of salt during the rendering; and as soon as there are no lumps of fat visible in the kettle I add about one per cent. of common salt. I stir it for some time. The rendered fat is then allowed to stand until it attains perfect limpidity, when it can be drawn off. By this means the separation is well made, and the organized tissues which do deposit are not altered. I then allow the melted fat to stand in a vessel, maintained at a temperature of about 86° to 98° until the stearine is crystallized. The mixture of stearine and oleomargarine may then be put in a centrifugal machine; and by the operation of this machine the oleamargarine will pass through the cloth and the stearine remain within; or the mixture may be subjected to pressure in a press. The effect produced in either case is that the oleomargarine practically separates from the stearine and flows out. The oleomargarine thus separated from the stearine, when cooled, constitutes a fatty matter of very good taste, which may replace the butter used in the kitchen. If it is desired, however, to transform it into more perfect butter, I employ the following means: I mix the oleomargarine, as it comes from the press or centrifugal machine, with milk and cream, equal to ten per cent. of the weight of the oleomargarine, the temperature of the milk and cream being about seventy-one (71) degrees, and thoroughly agitate them together. I then let the mixture become completely cold and solid, and then cause it to be worked between rollers, which give it the homogeneousness and the consistency which are the qualities of the natural butter.

The above process of agitating the oleomargarine with milk is intended to be adopted when the butter is to be immediately used. If the butter is intended to be preserved, it will be better to mix the oleomargarine at animal heat with ten per cent. of its weight of water instead of milk or cream, and then agitate the two together, as above described.

I have also found it expedient to mix with the cream or milk, in the first case above described, before agitating, or with the water in the other case above described, before agitating, a fiftieth part of mammary tissue, which is the udder of the cow, minced fine, a one-hundredth part of bicarbonate of soda, and some coloring matter.

It may be desirable to add ordinary butter, and this I do by mixing the oleomargarine and the ordinary butter together at a temperature of about 70° Fahrenheit.

What I claim as my invention, and desire to secure by Letters Patent, is—

1. The rendering of animal-fat at a low temperature, substantially as above set forth, for the production of a fatty matter devoid of disagreeable taste.

2. As a new product of manufacture, fat rendered at the low temperature, substantially as above described, devoid of disagreeable taste.

3. The combined process of rendering animal fat at a low temperature and then separating the oleomargarine for the purpose of producing a material adapted to be used as ordinary butter for culinary purposes, or to be further treated for making more perfect butter, substantially as above described.

4. As a new product of manufacture, oleomargarine obtained from fat rendered at a low temperature and separated from the stearine, substantially as above described.

5. The agitating of oleomargarine with water or milk for the purpose of making a more perfect imitation of butter, substantially as above described.

6. The butter-like product produced by the agitation of oleomargarine with water or milk, substantially as above described.

7. The treatment with artificial gastric juice for facilitating the process of rendering the fat at a low temperature, substantially as above described.

8. The treatment of the oleomargarine with the mammary tissue of the cow, or mammary pepsin, substantially as above described.

9. The addition of ordinary butter to oleomargarine, substantially as above described.

H. MÉGE.

Witnesses:
ROBT. M. HOOPER,
M. D. DESHLER.